(12) United States Patent
Hoshina

(10) Patent No.: US 7,675,887 B2
(45) Date of Patent: Mar. 9, 2010

(54) BASE TRANSCEIVER STATION

(75) Inventor: Koya Hoshina, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 547 days.

(21) Appl. No.: 11/391,176

(22) Filed: Mar. 29, 2006

(65) Prior Publication Data

US 2006/0221908 A1 Oct. 5, 2006

(30) Foreign Application Priority Data

Mar. 30, 2005 (JP) ............................. 2005-098792
Nov. 21, 2005 (JP) ............................. 2005-335989

(51) Int. Cl.
*H04B 7/216* (2006.01)

(52) U.S. Cl. ..................... 370/335; 370/342; 455/561; 455/524; 455/525; 455/450; 455/67.11

(58) Field of Classification Search ...... 455/560–562.1, 455/450–452.2, 524–525; 370/335, 342; 375/148

See application file for complete search history.

(56) References Cited

U.S. PATENT DOCUMENTS

| | | | | |
|---|---|---|---|---|
| 5,671,255 A | * | 9/1997 | Wang et al. | 375/341 |
| 5,923,650 A | * | 7/1999 | Chen et al. | 370/331 |
| 6,034,952 A | * | 3/2000 | Dohi et al. | 370/335 |
| 6,760,590 B2 | * | 7/2004 | Miyoshi et al. | 455/452.1 |
| 6,947,769 B1 | * | 9/2005 | Itomitsu et al. | 455/561 |
| 7,123,630 B1 | * | 10/2006 | Ueno | 370/517 |
| 7,173,919 B1 | * | 2/2007 | Dabak | 370/335 |
| 7,257,423 B2 | * | 8/2007 | Iochi | 455/561 |
| 7,372,836 B2 | * | 5/2008 | Hwang et al. | 370/335 |
| 7,403,508 B1 | * | 7/2008 | Miao | 370/335 |
| 2002/0110109 A1 | * | 8/2002 | Kawaguchi et al. | 370/342 |
| 2002/0176438 A1 | * | 11/2002 | Karjalainen | 370/441 |
| 2003/0045319 A1 | * | 3/2003 | Sarkar et al. | 455/522 |
| 2004/0264550 A1 | * | 12/2004 | Dabak | 375/142 |

FOREIGN PATENT DOCUMENTS

JP 2001-267959 A 9/2001
JP 2004-282469 A 10/2004

* cited by examiner

*Primary Examiner*—Sharad Rampuria
(74) *Attorney, Agent, or Firm*—Crowell & Moring LLP

(57) ABSTRACT

On the basis of a spreading factor obtained by despreading a control channel of received data by a control channel despreading unit, a spreading factor determination unit determines a transmission rate of the received data. User data subjected to despreading processing at a user data despreading unit is demodulated by a demodulator and temporarily stored in a demodulated data memory. The user data read from the demodulated data memory is decoded by a decoder, whereas the result of decoding by the decoder is supplied to a delay measurement unit, where a delay time relative to the above processing, of the user data is detected. A channel resource management unit manages the number of available resources at all times or in a constant cycle on the basis of transmission rates of respective radio channels detected by the spreading factor determination unit and delay processing times of the respective radio channels detected by the delay measurement unit.

15 Claims, 6 Drawing Sheets

FIG. 4

| SF | NUMBER OF PHYSICAL RESOURCES | NUMBER OF USED RESOURCES | SERVICE TYPE | TTI(ms) | SERVICE-DEPENDENT ALLOWABLE DELAY (ms) |
|---|---|---|---|---|---|
| 512 | 1 | 1 | 1 | 40 | 50 |
| 256 | 1 | 1 | 1 | 40 | 50 |
| 128 | 1 | 1 | 1 | 20 | 30 |
| 128 | 1 | 1 | 2 | 10 | 20 |
| 64 | 1 | 1 | 1 | 20 | 30 |
| 64 | 1 | 1 | 2 | 10 | 20 |
| 32 | 1 | 2 | 1 | 20 | 30 |
| 32 | 1 | 2 | 2 | 10 | 20 |
| 16 | 1 | 4 | 1 | 20 | 30 |
| ... | ... | ... | ... | ... | ... |
| 8 | 1 | 8 | 1 | 20 | 30 |
| 8 | 1 | 8 | 2 | 10 | 20 |
| 8 | 3 | 24 | 1 | 20 | 30 |
| 8 | 3 | 24 | 2 | 10 | 20 |
| 4 | 1 | 16 | 1 | 20 | 30 |
| 4 | 1 | 16 | 2 | 10 | 20 |
| 4 | 3 | 48 | 1 | 20 | 30 |
| 4 | 3 | 48 | 2 | 10 | 20 |

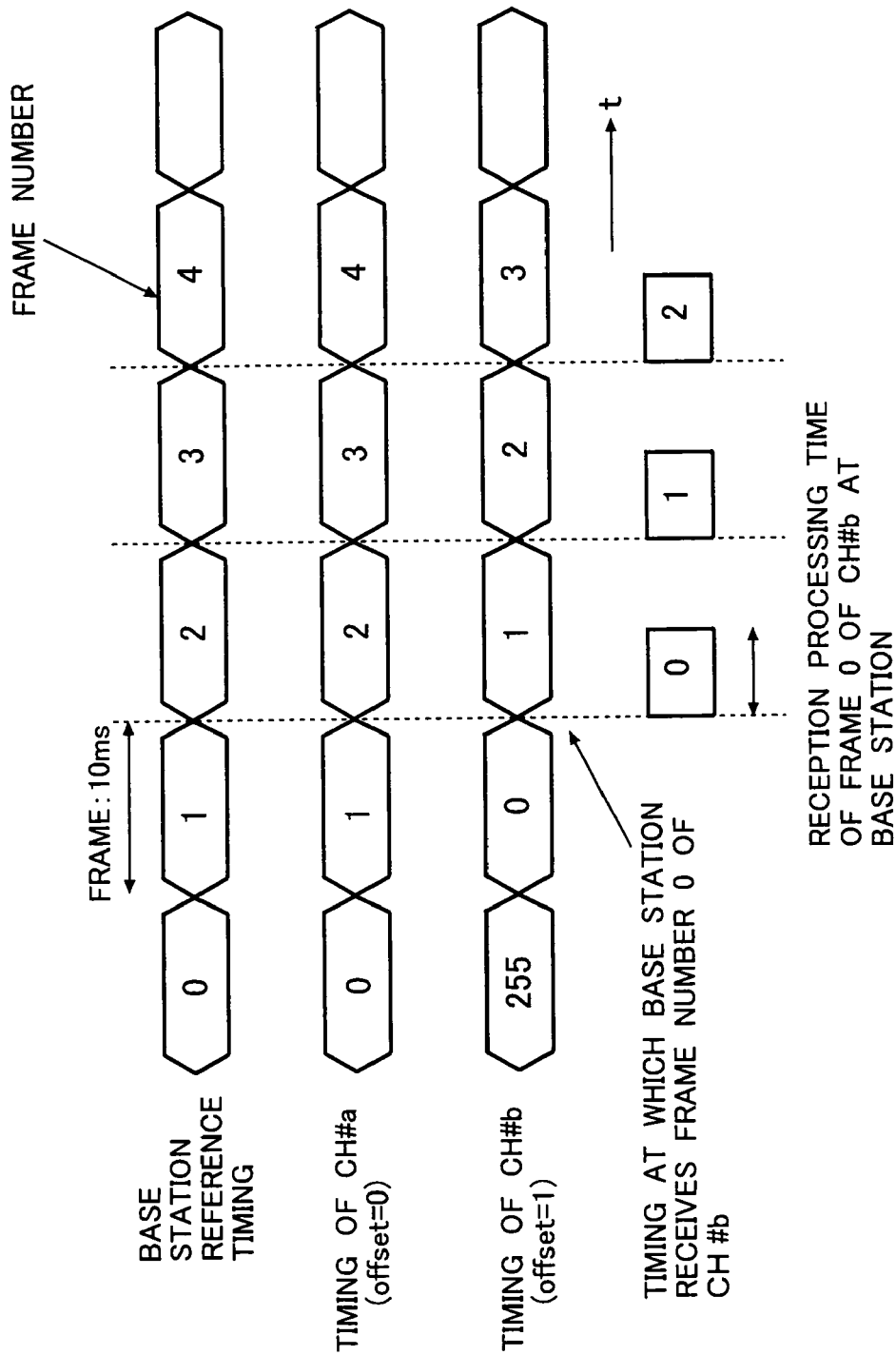

BASE TRANSCEIVER STATION

BACKGROUND OF THE INVENTION

1. Field of the Invention

The present invention relates to a base transceiver station employed in a radio communication system of a CDMA (Code Division Multiple Access) type, and particularly to resource management thereof.

2. Description of the Related Art

In a CDMA type radio system, various control information are transmitted as control channels, and user data such as voice data and packet data are transmitted as user channels. When such data are transmitted from a radio mobile station to a base transceiver station, the user channels are mapped onto an I axis and the control channels are mapped onto a Q axis respectively, followed by being QPSK-modulated in the mobile station. Further, they are subjected to spectrum spread modulation by spreading codes, followed by being transmitted to the base transceiver station. When the base transceiver station accepts a call from the mobile station, the base transceiver station receives the above spectrum spread modulated signal from the mobile station, despreads the control channels on the Q axis using the same spreading codes as the mobile station, and despreads the user channels on the I axis. A spreading factor (SF) of each spreading code used as transmission rate information of the spectrum spread modulated signal at its reception is extracted from each of the despread control channels. Then, phase control and coherent detection of each data channel spread-processed according to a transmission rate are carried out, followed by demodulation to user data. The demodulated user data are subjected to decoding processing such as an error correction, error detection, etc. (refer to, for example, a patent document 1 (Japanese Unexamined Patent Publication No. 2001-267959)).

A conventional control method for the base transceiver station will next be explained.

Upon communications between a mobile station and a base transceiver station under a radio communication system, the base transceiver station performs the transmission/reception of control information using a common channel (control channel) where, for example, a connection request (call) from a mobile station takes place, and shares parameters necessary to set each dedicated channel (data channel). When radio resources (resources necessary for transmission/reception) necessary to set the dedicated channels, and channel resources (i.e., a despread unit, a demodulator, a decoder, a memory, etc.) for the base transceiver station can be ensured, the base transceiver station performs the setting of each dedicated channel to the mobile station having made the connection request and starts communications of user data with the mobile station.

The base transceiver station performs reception of call setting information and setting processing in accordance with instructions issued from a radio network controller (RNC) corresponding to its host device. If, however, there is not enough free space for the channel resource of the base transceiver station, then the base transceiver station sends back reception disable information that a new call cannot be accepted, to the corresponding mobile station upon reception of the new call and does not perform the setting processing.

Thus, in order to make it possible to determine whether the call should be accepted, the base transceiver station performs the management of channel resources accommodable (i.e., allocable to a mobile station in which a call has occurred newly) therein. Such management relates to hardware and software processes, which are managed by the number of resources in advance every transmission rates available for uplink communications. Since the limited resources are applied statically in this management, a resource allocated to a call is not applicable to other call until the call is set free.

With the management of each resource in this way, a transmission rate of a communication signal (i.e., the above spectrum spread modulated signal) on a radio channel for a new call is detected when the new call is made. A decision is made as to whether the reception of this call is enabled according to whether the number of resources necessary for the transmission rate exists. However, the maximum transmission rate available for a set radio channel (channel corresponding to a spreading code in the CDMA system) is used as a transmission rate defined as a criterion as to whether the allocation of such resources is enabled. Even though the transmission rate becomes maximum among all held (i.e., set) radio channels, processes such as despreading, demodulation, decoding or the like of received user data on respective radio channels are performed without any delay so as to make it possible to ensure resources.

However, the uplink information (user data) decoded by the base transceiver station differ in parameter upon error correction processing or the like used in decoding processing, according to the type of applied data. With the difference between the parameters, resources for hardware to be utilized differ. Therefore, when a change in the type of data occurs in the uplink information from the mobile station to the base transceiver station where the uplink information is decoded, the resources for the hardware are switched on each occasion. The number of resources allocable to the corresponding radio channel is determined in consideration of even such a thing. Thus, the number of resources for the hardware is distributed to the mobile station having produced a call for a new connection request by giving consideration even to that a change in data type thus occurs in uplink information to be transmitted from now on. However, whether the number of resources should be distributed thereto (i.e., whether this call should be accepted) depends upon whether the number of resources available for the hardware at that time exists. That is, the number of processable channels differs depending on the number of resources for the hardware.

As a method for allocating the resource to the radio channel having accepted the call, there has been proposed a technique wherein a resource amount calculation table in which a symbol rate per each resource is represented by an uplink u-plane from a mobile station to a base transceiver station and a downlink u-plane from the base transceiver station to the mobile station, and a source amount calculation table indicative of the relationship between radio channel numbers and the number of resources are set, and a resource amount for the corresponding radio channel is allocated using such a resource amount calculation table (refer to, for example, a patent document 2 (Japanese Unexamined Patent Publication No. 2004-282469)).

According to the description disclosed in the patent document 2, a resource management table showing the relationship between signal processors and the number of resources available with respect to the same is set to perform resource management. The resource management table is retrieved based on the resource amount of the corresponding radio channel determined using the resource amount calculation table, and a signal processor having a vacant resource processable for the present radio channel can be selected.

When the radio channels are subjected to decoding processing (such as the settings of processing timings for a plurality of radio channels where the plurality of radio channels are decoded) by software, algorithms applied to the decoding are different in terms of the type of data or the like. Due to the difference between such algorithms, the time required to complete the decoding processing varies. Therefore, the number of channels accommodable (i.e., processable simultaneously) in the base transceiver station is not uniquely determined from only the transmission rate of each radio channel. Therefore, the storage capacity of the base transceiver station depends upon the throughput capacity of the decoder to make the best use of it. However, there is a need to define in advance the distribution of the number of resources set every data type applied to each radio channel, to the corresponding demodulator.

According to the above method for allocating the resources to the radio channels, even though the possible maximum transmission rate of each radio channel to which wireless communications are set is assumed, and the transmission states of all radio channels are simultaneously brought to the state of the maximum transmission rate, the storage capacities of hardware and software enough to simply enable the completion of processing within a prescribed time over all the radio channels. Therefore, the number of resources corresponding to each of the maximum transmission rates is allocated to each of these all radio channels.

On the other hand, the radio communication system such as the CDMA system or the like performs the transmission of user data through radio channels between the mobile station and the base transceiver station only where the transmission of the user data is required, in order to make good use of the limited radio resources. When there is no user data to be transmitted, the transmission of only the minimum information, i.e., control channels necessary to maintain the connections of the radio channels is performed. Described specifically, a transmission rate on a radio transmission line between a mobile station and a base transceiver station is reduced. Further, only closed-loop transmit power control information and transmission rate information used to control and hold transmit power between the mobile station and the base transceiver station to a proper value, and an identifier of a transmission rate, which is capable of identifying the presence or absence of user data, are repeatedly transmitted and thereby the connections of the radio channels are maintained.

Incidentally, voice data, packet data and the like are considered as the user data applied to such a radio communication system. However, when, for example, transmit user data on a radio channel is of voice data, a silent section exists about 50%. When the silent section is detected, the transmission of user data onto its corresponding radio transmission line is stopped on the transmitter side (the state of transmission of the user data is discontinued), and only control information such as the transmit power control information or the like on the radio channel is transmitted. Even in the case of the packet data, communications are carried out at a high transmission rate only where the acquisition of desired data such as download is required. When the acquisition of data is not necessary, the transmission of user data through the radio transmission line is stopped in a manner similar to the voice data, and the switching of a transmission state is performed in such a manner that only the control channel is transmitted at a low transmission rate. Thus, control on the switching of the transmission rate is dynamically carried out according to the presence or absence of the user data.

Thus, in the radio communication system for dynamically controlling the transmission rate, when the management of the channel resource (resource for the radio channel) in which its maximum transmission rate is assumed with respect to the radio channel as described above, is executed at the base transceiver station, data transmission is not carried out at all times at the maximum transmission rate over all the radio channels, and the transmission of data at the maximum transmission rate is rather rare. Therefore, a problem arises in that even though the number of resources is allocated to each radio channel according to the maximum transmission rate, at least some thereof is not used and the processing performance of the base transceiver station is not used to the fullest extent.

SUMMARY OF THE INVENTION

An object of the present invention is to provide a base transceiver station which resolves the foregoing problems and realizes resource management which enables the utmost use of a radio channel storage capacity.

According to one aspect of the present invention, for attaining the above object, there is provided a base transceiver station comprising:

a receiving section which receives spectrum spread data therein;

a spreading factor determination unit which extracts a transmission format of the spectrum spread data received by the receiving section and calculates a spreading factor from the transmission format;

a baseband signal receiver which processes the spectrum spread data, based on the transmission format of the spectrum spread data;

a delay measurement unit which calculates a processing time taken at the baseband signal receiver; and a channel resource management unit which manages each of resources on the basis of the spreading factor calculated by the spreading factor determination unit and the processing time calculated by the delay measurement unit, and performs a new call setting and the like.

According to another aspect of the present invention, for attaining the above object, there is provided a base transceiver station comprising:

a receiving section which receives therein spectrum spread data on dedicated channels allocated every mobile stations, and spectrum spread data on common channels transmitted on a time-division multiplexing basis from a plurality of the mobile stations by allocating the mobile stations every time slots;

a spreading factor determination unit for each dedicated channel, which extracts transmission formats of the spectrum diffusion data on the dedicated channels received by the receiving section and calculates spreading factors from the transmission formats;

a spreading factor determination unit for the common channel, which extracts transmission formats of the spectrum spread data set every time slots of the common channel, received by the receiving section and calculates spreading factors of the received data of the time slots from the transmission formats;

a baseband signal receiver which processes the spectrum spread data on the dedicate and common channels on the basis of the transmission formats of the spectrum spread data on the dedicate and common channels;

a delay measurement unit which calculates times for processing received data on the dedicate and common channels at the baseband signal receiver; and a channel resource management unit which manages resources relative to the dedicate and common channels on the basis of the spreading factors calculated by the spreading factor determination unit and the processing times calculated by the delay measurement unit and performs a new call setting and the like, wherein the baseband signal receiver comprises, a user channel despreading unit for each dedicated channel, which despreads the spectrum spread data of a user channel for each dedicated channel on the basis of the transmission format of the spectrum spread data on each dedicated channel, a demodulator for each dedicated channel, which demodulates user data on each dedicated channel, obtained by the despreading processing of the user channel despreading unit for each dedicated channel, a user channel despreading unit for the common channel, which despreads the spectrum spread data on user channels set every time slots of the common channel on the basis of the transmission formats of the spectrum spread data on the user channels set every time slots of the common channel, a demodulator for the common channel, which demodulates user data set every time slots of the common channel, obtained by the despreading processing of the user channel despreading unit for the common channel, a demodulated data memory which stores therein the demodulated user data outputted from the demodulator for each dedicated channel and the demodulator for the common channel, and a decoder which decodes the user data stored for predetermined data usage in the demodulated data memory, and wherein the user data on the dedicate and common channels are decoded by the decoder common thereto.

According to the present invention, resources dependent on hardware actually used with a predetermined timing are managed, and the allocation of channel resources is dynamically performed. It is therefore possible to realize source management which can make best use of a channel storage capacity as compared with the conventional system which performs the fixed allocation of channel resources. This management method can also be realized by using spreading factors and data incoming timing information managed even in the conventional case and adding the minimum functions for the determination of each spreading factor and delay of decoded data.

According to the present invention as well, since a common channel resource management unit manages used resources for the dedicate and common channels, the allocation of resources (hardware resource and software resource) for these channels to their corresponding channels can be changed even between these channels and properly set. It is also possible to eliminate redundancy of the occupation of each resource.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 4 is a diagram showing one specific example of a management table at a channel resource management unit in FIG. 1;

FIG. 6 is a diagram for describing frame numbers applied to respective radio frames for radio channels.

DETAILED DESCRIPTION OF THE PREFERRED EMBODIMENTS

Preferred embodiments of the present invention will be explained hereinafter with reference to the accompanying drawings.

Figure 1:
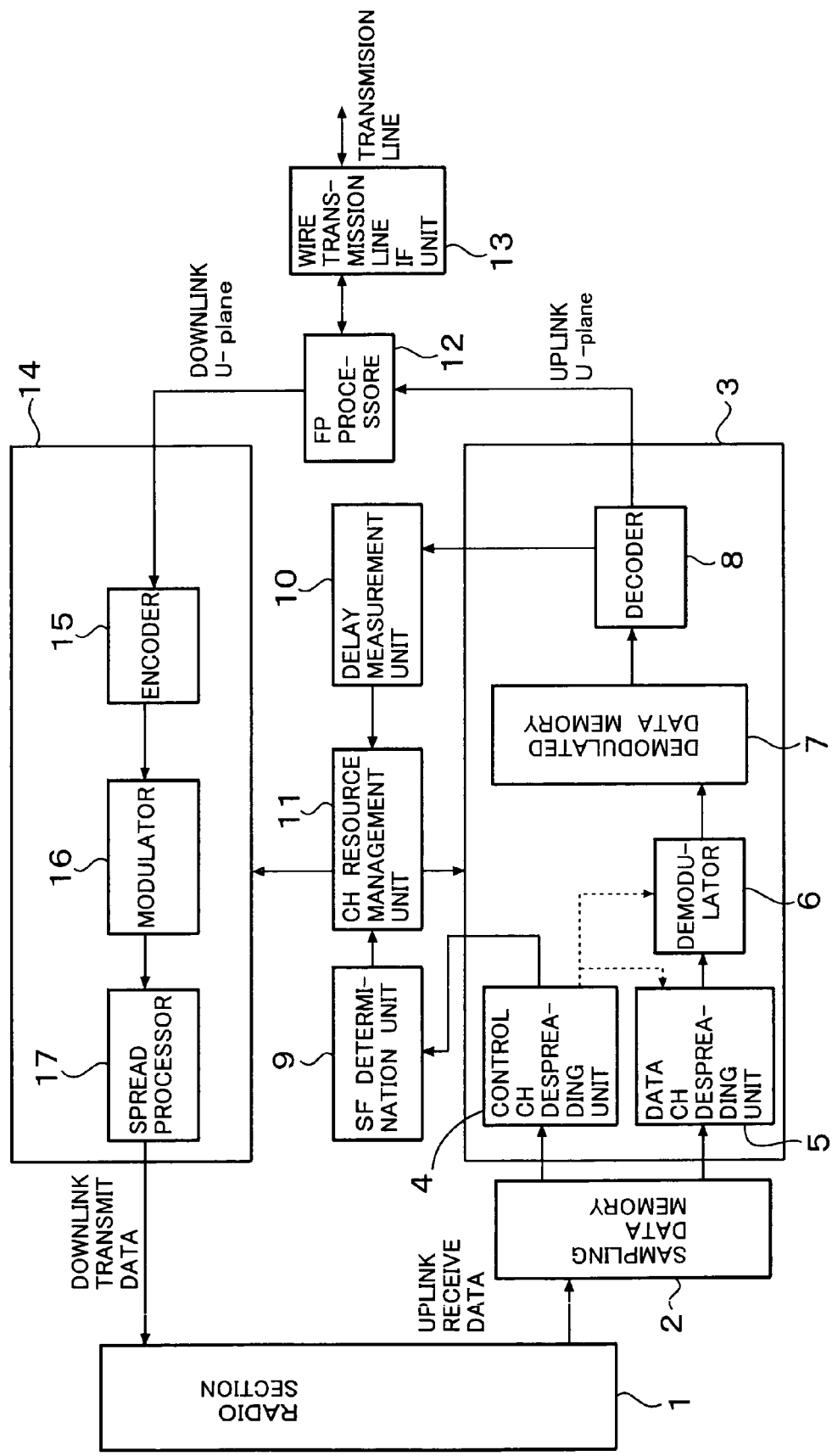
FIG. 1 is a block diagram showing a first embodiment of a radio mobile station according to the present invention.

FIG. 1 is a block configuration diagram showing a first embodiment of a base transceiver station according to the present invention. Reference numeral 1 denotes a radio section, reference numeral 2 denotes a sampling data memory, reference numeral 3 denotes a baseband signal receiver or receiving section, reference numeral 4 denotes a control channel despreading unit, reference numeral 5 denotes a data channel despreading unit, reference numeral 6 denotes a demodulator, reference numeral 7 denotes a demodulated data memory, reference numeral 8 denotes a decoder, reference numeral 9 denotes a spreading factor (SF) determination unit, reference numeral 10 denotes a delay measurement unit, reference numeral 11 denotes a channel (CH) resource management unit, reference numeral 12 denotes a frame protocol (FP) processor, reference numeral 13 denotes a wire transmission line interface unit, reference numeral 14 denotes a baseband signal transmitter or transmitting section, reference numeral 15 denotes an encoder, reference numeral 16 denotes a modulator, and reference numeral 17 denotes a spread processor, respectively.

In the same figure, a spectrum spread modulated signal (received data) of an uplink radio channel, which is received at the radio section 1 and subjected to A/D conversion, is stored and held in the sampling data memory 2 for each sampling data of plural word lengths. The received data stored in the sampling data memory 2 is supplied to the baseband signal receiving section 3.

Figure 2:
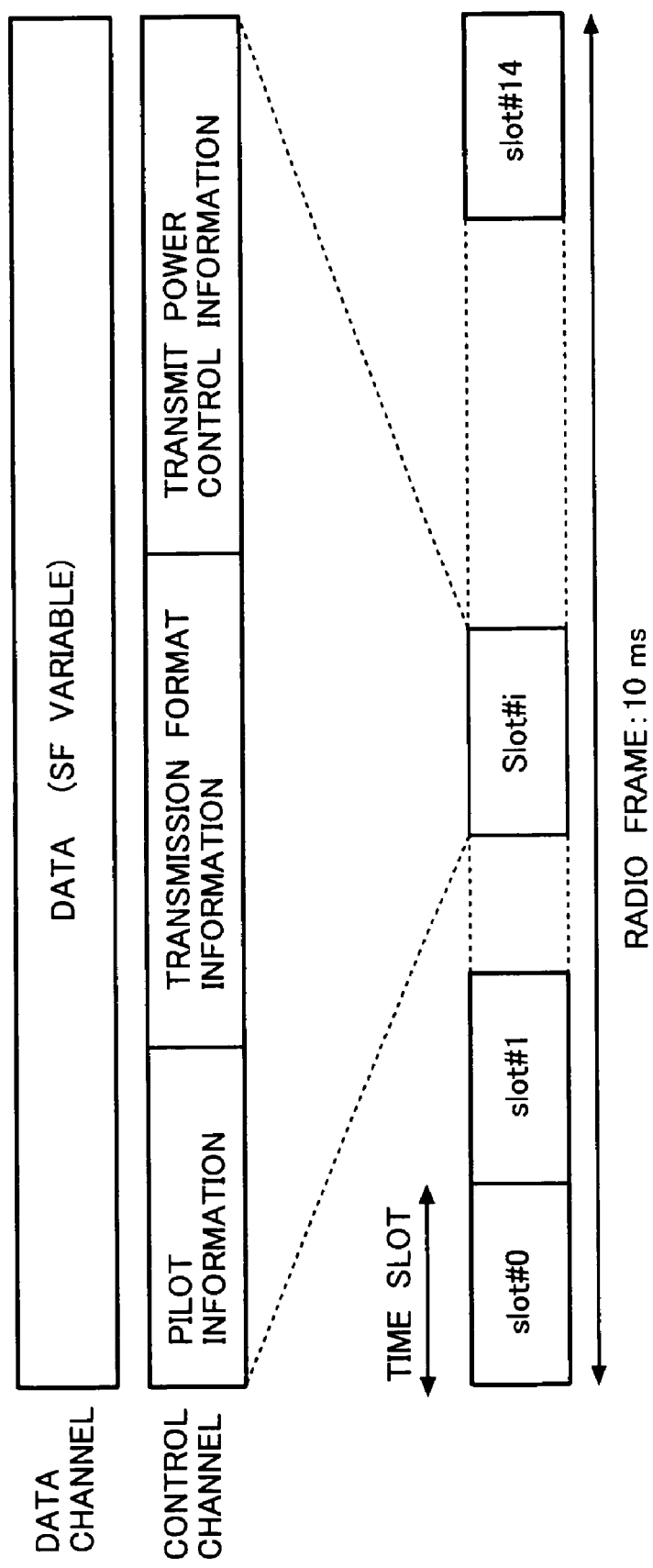
FIG. 2 is a diagram illustrating a transmission format employed in a CDMA system.

Now, as shown in FIG. 2, the received data comprises a data channel and a control channel both brought into multiplexed form and is represented with a 10-msec radio frame constituted of a plurality of slots slot#1 through slot#m as a reference unit. Each radio frame is given a frame number. Each slot in the data channel corresponds to user data spread-processed by a spreading code and is made variable in spreading factor SF (the number of chips for spreading codes per symbol) of each spreading code at spreading modulation processing, depending upon the type of user data (service applications such as voice data, packet data, etc.). Each slot of the control channel comprises control information such as pilot information, transmission format information and transmission power control information and is constant in spreading factor SF of each spreading code at the spreading modulation processing. The positions to insert these information in each slot are determined in advance. The pilot information is of information represented in a predetermined constant pattern of "1" and "0" and is already known on the transmitter and receiver sides.

In the baseband signal receiving section 3, the control channel of the received data sent from the sampling data memory 2 is supplied to the control channel (CH) despreading unit 4, whereas its data channel is supplied to the data channel (CH) despreading unit 5.

For each slot of the control channel, the control channel despreading unit 4 generates a spreading code used upon spreading modulation on the transmitter side (corresponding to a mobile station communicated via the radio channel) from its spreading-modulated pilot information and the known pattern's pilot information and effects despreading processing on the control channel using the spreading code to thereby detect transmission format information and transmission power control information. At this time, the demodulator 6 calculates even a phase shift amount used in the detection of a data symbol in the user data and its phase compensation from the known pattern's pilot information inserted in the control channel.

The data channel despreading unit 5 extracts a transmission rate (i.e., spreading factor SF of spreading code) of the received data from the transmission format information (see FIG. 2) detected by the control channel despreading unit 4 and effects despreading processing on a data channel, using the spreading code at a rate corresponding to the extracted transmission rate.

The user data subjected to the despreading processing is supplied to the demodulator 6, where processes such as coherent detection, phase compensation, a maximum ratio combining and the like are effected thereon using the transmission rate and phase shift amount extracted by the control channel despreading unit 4 to thereby obtain demodulated user data. The user data is stored in the demodulated data memory 7.

While such despreading processing and demodulation of the user data are carried out in radio frame units, the process of extracting the respective control information from the corresponding control channel is performed at the control channel despreading unit 4 and thereafter a data channel of a radio frame corresponding to a radio frame for the so-processed control channel is read from the sampling data memory 2 and subjected to despreading processing at the data channel despreading unit 5, followed by demodulation such as QPSK or the like at the demodulator 6.

Incidentally, when a plurality of radio channels are received, the above despreading processing and demodulation are effected on the respective radio channels, and the so-demodulated user data are stored in the demodulated data memory 7 every radio channels.

The user data of the respective radio channels stored in the demodulated data memory 7 are read from the demodulated data memory 7 according to their transmission rates, followed by being supplied to the decoder 8, where framing processing is effected thereon for each data type after error correction processing corresponding to coding processing applied on the transmitter side and CRC detection based on predetermined parameters, followed by being supplied to the frame protocol (FP) processor 12. The frame protocol processor 12 performs frame protocol processing necessary for interface with each wire transmission line. The user data subsequent to the frame protocol processing are supplied to the wire transmission line interface (I/F) unit 13, where conversion such as assembly/deassembly or the like is effected on ATM (Asynchronous Transfer Mode) cells, after which the so-processed data are sent out to a radio network controller (RNC: not shown) corresponding to a host device of a base transceiver station through the corresponding wire transmission line.

Upon the processing of an uplink reception channel, transmission format information (spreading factor: FIG. 2) are extracted from control channels at radio channels (being in communication) held in the control channel despreading unit 4. The spreading factor (SF) determination unit 9 calculates spreading factors SF being applied to the respective radio channels and thereby acquires transmission rates at the respective radio channels. Information about the transmission rates obtained at the spreading factor determination unit 9 are supplied to the channel (CH) resource management unit 11. The channel (CH) resource management unit 11 manages channel resources of the baseband signal receiving section 3 in the base transceiver station, using the transmission rates of the respective radio channels.

The result of decoding of the user data decoded by the decoder 8 is supplied to the delay measurement unit 10. The delay measurement unit 10 measures delay times at decoding processing every uplink radio channels from the frame numbers of the decoded radio frames (see FIG. 2) accompanying the result of decoding and timing information for detecting timing at which the decoding of each radio frame is completed, etc. The measured delay times are supplied to the channel (CH) resource management unit 11 as information set every radio channels. The channel (CH) resource management unit 11 manages the resources of the base transceiver station from the delay times and the transmission rates every radio channels. This management is carried out at all times (every slots used as the minimum units of the received data, for example (see FIG. 2)) or every predetermined periods (radio frames each comprising a plurality of the slots (see FIG. 2)).

Upon downlink communications from the base transceiver station to each mobile station, data on respective radio channels received at the base transceiver station through an ATM circuit are assembled/disassembled at the wire transmission line interface unit 13. The frame protocol processor 12 performs conversion of the data into transmission formats and adjustments to timings provided to send out the data to the mobile station through its corresponding radio transmission line, in accordance with a frame protocol and thereafter supplies the same to the baseband signal transmitting section 14. In the baseband signal transmitting section 14, the encoder 15 effects channel encoding processing on the user data supplied from the frame protocol processor 12, the modulator 16 modulates the same in accordance with a modulation scheme such as QPSK or the like, and the spread processor 17 performs spreading modulation processing based on a predetermined spreading code on the same data. The so-processed data is transmitted from the radio section 1 as downlink transmit data.

Prior to the detailed description of the first embodiment, the transmission format of the CDMA communication system to which the first embodiment is applied, will now be explained.

In the CDMA communication system, the sizes of data (information) to be handled depending upon respective service applications (voice, packet data, etc.) are different from one another. The data sizes depend on required quality levels of services. In the case of the packet data, for example, data of a few hundred of kbits to a few tens of kbits are continuously transmitted. As evaluation criteria for the required quality levels, there are known a data error mixed on the transmission line and a processing delay at the apparatus. That is, measures such as the setting of reducing a spreading factor SF of each spreading code applied to the encoding/decoding of baseband signal processing, etc. are taken with respect to services not allowed to cause the data error. In services which need real-time properties of communications such as voice phone calls or the like, the maximum allowable processing delay time is defined.

In the base transceiver station, service types different in the same radio channel exist in mixed form according to the applications to these mobile stations. When attention is paid to a transmit signal of an uplink radio channel, the baseband signal processor of the corresponding mobile station on the transmitter side performs encoding processing in units of data dependent on the services, whereas the interval (period) of transfer of the data is done in units of a few tens of msec. This transfer interval is called "transmit time interval".

Encoded data set every transmit time intervals are divided into radio frames corresponding to transmit time units on a radio transmission line, which in turn are mapped and sent out. In the first embodiment, the radio frame is defined as 10 msec as shown in FIG. 2. The data mapped into the radio frames on the radio transmission line are constituted of symbol data corresponding to units of modem such as QPSK or the like. Further, the symbol data become a set of chip data corresponding to spreading code units. The number of chips at which one symbol data is spreading-modulated, i.e., the number of spreading codes used to spreading-modulate one symbol data corresponds to a spreading factor SF. The spreading factor SF varies according to the service types (voice, packet data, etc.). Thus, transmission rates for transmit data differ according to the service types.

As the receiving operation of the base transceiver station, the demodulator 6 effects demodulation processing on the user data of the radio frame having the time length of 10 msec, subsequent to the despreading processing at the data channel despreading unit 5 and stores data corresponding to a transmit time interval (a few tens of msec) applied on the transmitter side in the demodulated data memory 7 as post-demodulation symbol data. Then, the decoder 8 starts decoding processing at the completion of demodulation of all data brought to encoding units on the transmitter side. The baseband signal processor 3 of the base transceiver station according to the first embodiment is operated with being predicated on a radio system to which the above format is applied. Each user data communicated between each mobile station and the base transceiver station is handled as a channel within the base transceiver station. This will be defined as "channel" below.

A channel resource managing method based on the channel resource management unit 11 indicative of the feature of the first embodiment will be explained.

In the CDMA communication system or the like, an uplink signal (communication signal of uplink radio channel) is brought to a variable transmission rate. That is, as to the transmission rate on the radio transmission line, when user data to be transmitted exists, the transmission rate is raised, whereas when there is no information to be transmitted, the transmission rate is set low. Then, its transmission rate and transmission format are notified from a mobile station to a base transceiver station through an uplink control channel. The receiving side of the base transceiver station makes a decision as to the transmission rate of the uplink signal through the use of its control information and performs demodulation of a data channel and data decoding.

The transmission of the variable transmission rate according to the above amount of information is carried out in a cycle of a radio frame unit of 10 msec or so at shortest time in the first embodiment. The channel (CH) resource management unit 11 always calculates the used number of resources for uplink demodulation and decoding processing from a transmission rate of a corresponding radio frame of a user channel with respect to the uplink demodulator 6. When the setting (reception) of a new call from the mobile station to the base transceiver station occurs, the channel (CH) resource management unit 11 compares the remaining accommodable number of resources calculated from the number of resources being in use at present and the maximum used number of resources relative to a radio channel of the new call in accordance with instructions issued from the host device. When the accommodable number of resources is found to be large from the result of its comparison, the channel (CH) resource management unit 11 effects a setting for the radio channel of the new call on the baseband signal receiving and transmitting sections 3 and 14 and accepts the new call. As determination elements for making a reception decision as to the call, two elements of a physical hardware resource such as the despreading unit, demodulator, decoder, memory or the like for processing of the data channel at the baseband signal receiving section 3, and a temporal throughput capacity capable of processing actually received spectrum spread data, i.e., a temporal resource (software resource) related to processing timing at the time that signal processing is carried out by software, are used, and hence the resource management is carried out using the two elements.

The hardware resource corresponding to the first determination element will first be explained here.

The sampling data memory 2 and the demodulated data memory 7 are respectively used to store sample data prior to the despreading processing with respect to the uplink signal to the base transceiver station and symbol data subsequent to the demodulation processing. Since the sampling data corresponding to data subsequent to AD conversion of the data received at the radio section 1 is of data spread-modulated by a spreading code applied on the transmitter side, it is common data transmitted from each mobile station and subjected to spreading code multiplexing. The data channel despreading unit 5 despreads sampling data for each reception channel using separately-detected timing information and the spreading code applied on the transmitter side. Thus, the storage capacity of the data channel despreading unit 5 at the base transceiver station is determined based on an despreading processing time processable per unit time. The despreading processing is dominant in the operation or computation of the sum of products of the spreading code and the post-AD conversion sampling data. Assuming that the number of multi-paths generated due to reflection or the like on the radio transmission line is constant with the fixing of a spreading rate applied in the CDMA communication system within a system, the despreading processing time is placed in a relationship in which it is substantially inversely proportional to the spreading factor SF.

Compiling the spreading factors SF of the respective radio channels at the present moment where throughput per unit time is defined as the reference from the above relationship enables management of the resource of the data channel despreading unit 5.

On the other hand, since the despread and demodulated user data (demodulated user data) are different in spreading code applied upon their transmission every radio channels, the user data are stored in the demodulated data memory 7 as demodulated data every radio channels. Each user data subsequent to the despreading processing is subjected to phase compensation and processing of the maximum ratio combining of multipath components and thereafter handled as symbol data having plural word lengths. Since the symbol data stored in one radio frame is inversely proportional to the transmission rate of the radio frame, i.e., spreading factor SF, the number of data inputted to the demodulated data memory 7 can also be calculated in a manner similar to the calculation of the resources at the above user channel despreading unit 5. However, user data units set every service depend upon service types applied every user data without being fixed. Therefore, the post-demodulation symbol data need storage of user data corresponding to a few tens of msec equivalent to a transmit time interval on the transmitter side, i.e., a few radio frames. At the time of the completion of demodulation of the user data corresponding to the few radio frames, decoding processing at the decoder 8 is enabled. That is, it is necessary to convert a processing time unit from a radio frame unit to a transmit time interval unit. The demodulated data memory 7 accommodates temporal variations among respective radio channels at this time. Since the symbol rates of the respective radio channels are variable at radio frame time intervals as the minimum units, the memory capacity of the demodulated data memory 7 is ensured on the assumption that each radio channel is transmitted at the maximum symbol rate.

In the baseband signal receiving section 3 of the base transceiver station comprising the above configuration, the channel resource management unit 11 always compiles spreading factor information set every radio channels, outputted from the spreading factor determination unit 9 as uplink transmission rates of the radio channels held in the base transceiver station, in other words, the number of transmission data per unit time and manages each resource with throughput per unit time as the reference. When the reception of each radio channel into a service area as instructions issued from the host network device takes place with respect to a newly-called base transceiver station, the channel resource management unit 11 compares the present number of available resources and the required number of resources based on the maximum transmission rate information of a newly-accepted radio channel. When it is judged that the result of comparison can be held in the base transceiver station at the present moment, the number of resources referred to above can be held at the hardware resource corresponding to the first determination element.

The temporal resource (software resource) related to the processing timing, corresponding to a second determination element will next be explained.

Data communicated between each mobile station and the base transceiver station are different in transmission rate of user data and transmit time interval according to applications applied or adapted to the mobile station, i.e., the type of service. Further, the timings of respective uplink radio channels to the base transceiver station differ depending upon delays in the propagation of a radio wave from the mobile station located within its corresponding service area of the base transceiver station and timing provided to newly start communications. A frame timing used as the reference timing for the base transceiver station is executed under the control of the host network device to avoid concentration on a given timing in such a manner that timing offsets lying within radio frames in chip units corresponding to units of spreading codes and offsets relative to transmit time intervals in radio frame units are set at random.

When, however, the randomness of communication requests among mobile stations and so-called handover or the like moved among service areas for a plurality of base transceiver stations are taken into consideration, these timing offsets do not always have ideal randomness as viewed within a given base transceiver station. Such a case that a timing deviation or shift occurs to some extent is also imagined with ease.

The second determination element applies a restriction to the management of each channel resource where the deviation in timing occurs.

FIG. 3 shows an example illustrative of timings for uplink decoding processing at the baseband signal receiving section 3 in the base transceiver station.

The decoding processing time at the decoder 8 is dominant as a processing time for an uplink signal in the base transceiver station. Thus, when decoding processing start timings at the decoder 8, of respective radio channels held in the base transceiver station (i.e., communicated upstream with the present base transceiver station at the present time) are ideally dispersed as shown in FIG. 3(*a*) on the assumption that delay times due to the frame protocol processing of the frame protocol processor 12 and the processing of the wire transmission line interface unit 13 subsequent to the decoding processing for the uplink signal are sufficiently small, a total processing delay time $D_n$ in the base transceiver station, of uplink data corresponding to a given radio channel #n is expressed in the following equation assuming that the delay time (i.e., decoding processing delay time) based on the decoding processing is $P_n$:

$$D_n = P_n + \alpha n \quad (1)$$

where $\alpha_n$ indicates a processing time between the arrival of all user data corresponding to one transmit time interval relative to the radio channel #n at the base transceiver station and the storage of the user data in the demodulated data memory 7 after their despreading processing and demodulation. Since the unit time for this processing corresponds to processing in a cycle shorter than a transmit time interval less than or equal to each radio frame length, it is a delay time small than the decoding processing time $P_n$ although variations occur according to transmission rates.

Thus, when the uplink processing delay times of the plurality of radio channels held at present are sufficiently and ideally dispersed in decoding processing start timing thereof, or when there exists only one of the radio channels accommodated in the base transceiver station, such a radio channel is sent out to its corresponding wire transmission line with a delay of only a time interval necessary for its decoding processing.

On the other hand, when all the decoding processing start timings for the plurality of radio channels #0 through #n coincide with one another as shown in FIG. 3(*b*), the decoding processing start timing for these radio channels #0 through #n are sequentially shifted so as not to overlap one another in decoding processing. Therefore, the total processing delay time $D_n$ of the radio channel #n at which decoding processing is finally started, is given as follows:

$$D_n = \Sigma D_x + P_n + \alpha_n \ (x=0 \sim n-1) \quad (2)$$

That is, when processing or processes related to the plurality of radio channels are serially executed by software, processing times $(D_0 + D_1 + \ldots + D_{n-1})$ for all the radio channels processed prior to the channel #n are accumulated in a processing delay time $(P_n + \alpha_n)$ of the channel #n with respect to the respective radio channels. FIG. 3(*b*) shows such a state.

Since, at this time, the delay times containing the delay times for the radio transmission line, wire transmission line and apparatus, which are required depending on the adapted application types, are defined as mentioned previously, it is necessary to send out the result of decoding of all uplink received data within the prescribed delay time distributed to the base transceiver station as the throughput capacity of the base transceiver station. In the decoder 8 in the baseband signal receiving section 3 of the base transceiver station according to the first embodiment, the decoding processing is managed based on the sequential frame numbers applied to the radio frame units of the received radio channels. Therefore, when the decoding of each radio frame is completed at the decoder 8, the decoder 8 outputs the frame number of the corresponding radio frame to the delay measurement unit 10.

Figure 3A:
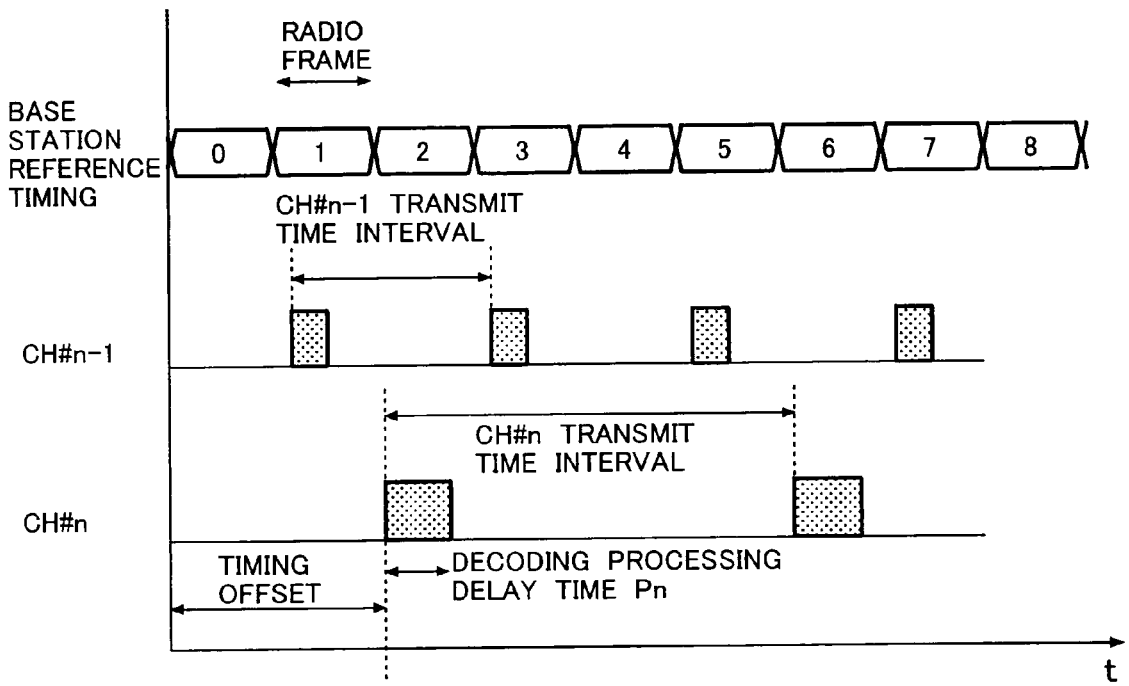
FIG. 3 is a timing chart depicting decoding process delay times of user data on radio channels at a decoder in FIG. 1.
Figure 3B:
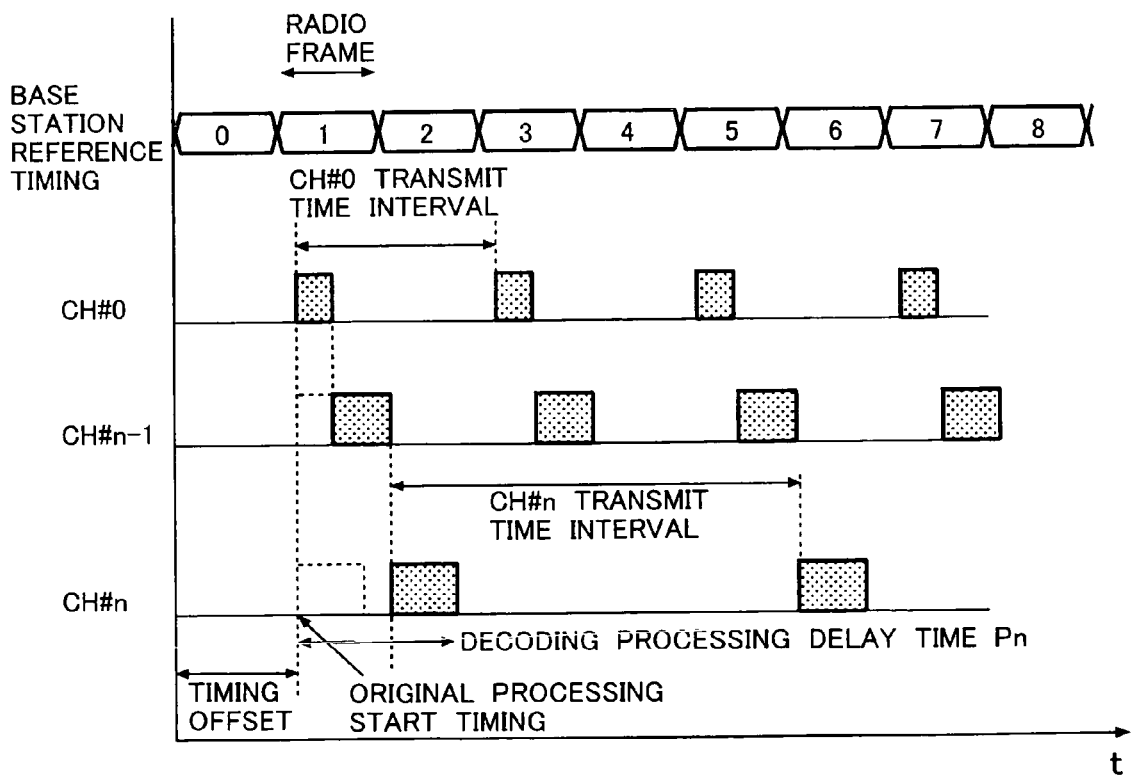

The delay measurement unit 10 calculates a difference between each of offset value information with respect to frame numbers at the completion of decoding every radio channels and transmission timings for the base transceiver station, which have been applied in advance to the respective radio channels, and operation timing information (base transceiver station reference timing in FIG. 3(b)) defined as the reference for the base transceiver station, from the offset value information and the operation timing information to thereby measure an uplink delay time. The radio channel #n shown in FIG. 3(b) will be explained by way example. Offset value information with respect to each transmission timing provided for the base transceiver station sets an offset (timing offset in FIG. 3(b)) from a radio frame 0 used as the reference associated with operation timing information used as the reference for the base transceiver station. The timing provided to start decoding processing at the decoder 8 is determined based on the timing offset. Thus, the delay measurement unit 10 is capable of detecting the timing provided to start decoding processing at the radio channel #n from the offset value information with respect to the transmission timing for the base transceiver station and the operation timing information used as the reference for the base transceiver station. When the result of decoding at the radio channel #n is supplied from the decoder 8 to the delay measurement unit 10, the delay measurement unit 10 can detect its supply timing from the operation timing information used as the reference for the base transceiver station. This timing is referred to as "decoding end timing". A decoding processing delay time $P_n$ at the radio channel #n can be acquired from the difference between the decoding end timing and the start timing for the decoding processing.

Incidentally, when the offset value information (i.e., timing offset) with respect to the transmission timing for the base transceiver station differs for each radio channel as shown in FIG. 3(a), the decoding processing delay time $P_n$ results in an actual processing time at the decoder 8. However, all decoding processing start timings at the plurality of radio channels #0 through #n coincide with one another as shown in FIG. 3(b). Therefore, when the decoding processing start timings are shifted from the timings designated by the timing offsets in order of the radio channels #0, #1, #2, . . . #n, a decoding processing delay time $P_n$ corresponding to a latency time from the timing offset to the completion of preceding decoding processing of each radio channel increases. Since the decoding processing is started from the completion of decoding processing at the radio channels #0 through #n−1 in the case of the radio channel #n, for example, a decoding processing delay time $P_n$ corresponding to a latency time from the timing designated by the timing offset to the actual start of decoding processing increases.

The channel resource management unit 11 always monitors based on the uplink decoding processing delay amount set for each radio channel, calculated by the delay measurement unit 10, whether the decoding processing has been completed within a prescribed or specified time. With the execution of such monitoring, temporal resource management related to the processing timing corresponding to the second determination element is performed.

In this case, a threshold value or level $T_{th}$ which allows a prescribed delay time to have a margin is set. When there exists a radio channel in which a processing delay exceeding the threshold value is being developed, the reception of a call is not made to such a radio channel that a call is newly made to the base transceiver station, even where the vacancy occurs in the hardware resource such as the despreading processing or the like corresponding to the first determination element.

This will be described in detail with the radio channel #n placed in such a state as shown in FIG. 3(b) being taken by way of example. Since the all-processing delay time of the radio channel #n is given as $D_n$, data at the radio channel #n received at a time t by the base transceiver station is outputted to the host device of the base transceiver station at a time $(t+D_n)$.

On the other hand, a delay time $(P+\alpha)$ is previously defined for a call set to the base transceiver station. Incidentally, P indicates a decoding processing time for a radio channel associated with a new call, and $\alpha$ indicates a time for processing prior to the decoding as mentioned above.

Assuming that the maximum all-processing delay time allowable for the base transceiver station is given as $D_{max}$, the time from the reception of the radio channel #n to the output thereof to the host device after each processing thereof must be not greater than the maximum all-processing delay time $D_{max}$. Thus, when the all-processing delay time $D_n$ of the radio channel #n exceeds the all-processing delay time $D_{max}$ in a state in which the radio channels #1 through #n are now being received, the reception of a new call is not carried out with the throughput capacity of the base transceiver station being over. Since a sufficient margin is not given in the case of $D_n \approx D_{max}$ where the radio channel of the new call is accepted, although the all-processing delay time $D_n$ of the radio channel #n does not exceed the all-processing delay time $D_{max}$, there may be cases where its all processing delay time $D_{n+1}$ exceeds the maximum all-processing delay time $D_{max}$ and the throughput capacity of the base transceiver station is over. In order to prevent it, the above threshold value $T_{th}$ is set and a new call is accepted in a state of communication with the current radio channel when there is a margin for the processing time of such a threshold value $T_{th}$.

Assuming that one example of the threshold value $T_{th}$ at which a processing delay time from the execution of the above respective processes on the corresponding radio channel after its reception in all service types accommodable in the base transceiver station to the output thereof to the host device is maximum, is expressed as $(P+\alpha)_{max}$, $T_{th}$ is given as follows:

$$T_{th}=(P+\alpha)_{max}$$

Therefore, now consider where a new call is given. Since the all-processing delay time of the radio channel #n maximum in all-processing delay time, of the radio channels currently held in the base transceiver station is $D_n$, the radio channel corresponding to the new call is accepted when the following is met:

$$D_n+T_{th} \leq D_{max} \tag{3}$$

When the equation (3) is not satisfied, the reception of a new call is avoided assuming that the used number of resources exceeds the number of resources available for the base transceiver station.

FIG. 4 is a diagram showing one specific example of a management table at the channel resource management unit 11 shown in FIG. 1.

In the same figure, information about the radio channels held at the present time (i.e., they are in communication with the base transceiver station) have been registered in the management table. According to such a management table, management using the hardware resource corresponding to the first determination element and management using the temporal resource corresponding to the second determination element are carried out.

The management using the hardware is of management based on the spreading factors SF as described above and makes use of elements of spreading factors SF, physical channels and used resources in the management table. The spreading factors SF and the number of used resources are placed in a one-to-one relationship. The number of physical channels corresponds to the number of channels used in one radio channel. A plurality of physical channels can also be assigned to one user. Referring to FIG. 4 by way of example, three physical channels are used as channels at SF=8. These physical channels are made different in spreading factor thereamong. The used number of resources in this case simply becomes three times. That is, resources corresponding to the allowable number of physical channels are assigned to the radio channel according to parameters instructed upon call setting.

In the first determination element, the numbers of used resources corresponding to all physical channels set to the base transceiver station are accumulated to determine the current total number of used resources. The remaining number of resources is managed as mentioned above.

In the management using the temporal resource corresponding to the second determination element, the processing delay time is managed as described above. In FIG. 4, the management makes use of elements of the type of service, a TTI (Transmission Time Interval) and a service-dependent allowable delay time.

The service type indicates an identifier which is indicative of adapted applications such as voice data, packet data, etc. The TTI indicates a transmit time interval designated for each service type and shows a decoding unit of data. The first embodiment shows that the data expressed in the radio frame (10 msec: FIG. 2) units are collectively handled by a predetermined number. When TTI=40 msec, for example, data received in radio frame units at the radio section 1 are stored in the receiving section 3 of the base transceiver station by 4 frames. Thereafter, the data corresponding to the 4 radio frames are decoded as one data processing unit. Thus, the time required from the timing received at the base transceiver station to the sending-out of the data to the host device, i.e., the processing delay time at the base transceiver station depends upon the TTI. The measurement of a processing delay time, using the relationship between each received frame number and its corresponding time stamp is executed for each data of the TTI unit.

The management table shown in FIG. 4 further includes processing delay times (service-dependent allowable delay times) at the base transceiver station, which are applied every service types and allowable in terms of a system configuration. Thus, it is also possible to monitor how the processing delay time of the radio channel in process at present has a margin for a required processing delay time and whether the processing delay time exceeds the maximum allowable time (maximum all-processing delay time $D_{max}$ referred to above).

A description will now be made of an example in which resources are determined from spreading factors SF and processing delay times compiled every radio channels.

A decision based on SF corresponding to the first determination element will first be explained.

Assuming that, for example, SF=64 at a radio channel for voice data, and SF=4 at a radio channel for packet a, these represent transmission rates in a straightforward manner. If the transmission rate is assumed to be 960 ksps (symbol per second) at SF=4, then the transmission rate becomes 60 ksps when SF=64. Obviously, the case of SF=4 is large in throughput per unit time at the base transceiver station.

On the other hand, there is a limit to the hardware resource such as the memory at the receiving section 3 of the base transceiver station. Even when the resource is realized by software, there is a limit to the number of channels processable within a given time interval by a CPU resource. Therefore, when voice channels are limited to 16 channels, for example, a packet channel is limited to one channel.

Now assuming that the unit of the number of resources is introduced as a unit for performing management for call allocation, a packet makes use of 16 resources at one channel when one voice channel corresponds to one resource. When the number of channels accommodable in the base transceiver station is managed by the number of resources referred to above, sixteen resources can be held at maximum per one base transceiver station in the present example. When one channel is set to the voice, call-reception control is carried out with the remaining number of resources=15. Since each uplink channel is variable in SF, i.e., a transmission rate based on a radio frame unit at a transmission format is changed depending upon user data, the number of resources applied to the resource management is not fixed with respect to each channel and is managed using the current applied SF at that channel.

On the other hand, the baseband signal processor (corresponding to each of baseband signal receiving section and baseband signal transmitting section) of the base transceiver station comprises resources for common channels used to notify information about a service area (cell) constituted of a base transceiver station to mobile stations existing in the cell and to transmit control information used for the reception of a new call and the setting of each radio channel to the base transceiver station, and resources for dedicated channels for transmitting data and control information between each mobile station and a base transceiver station in a one-to-one relationship. Now, the dedicated channels are assigned every mobile stations (users) in the cell and correspond to the radio channels employed in the first embodiment. The common channels are assigned every base transceiver stations and divided every time slots. These time slots are allocated every mobile stations in the cell. Thus, communications based on the common channels between the respective mobile stations and the base transceiver station are carried out by a time-division multiplexing system.

While the common channels are principally used in the communications of control information for connecting the dedicated channels, they are applied even to the transmission of user data such as packetized user data (hereinafter called "packet data") easy to divide and send. While a series of time slots in a predetermined cycle at each common channel and each mobile station in the cell correspond in a one-to-one relationship, time-sharing transmission of user data by packets between the base transceiver station and each mobile station on the basis of such time slots is intended for transmission of user data. However, the common channel is different from each dedicated channel for identifying a user, based on the allocation of its corresponding spreading code and transmitting user data. That is, the transmission of the user data is carried out even at the common channel.

Thus, when the transmission of the user data is performed through the common channel, the baseband signal receiving section for receiving and processing such user data is required and the baseband signal transmitting section for transmitting such user data is necessary. Although the first embodiment shown in FIG. 1 does not take into consideration each common channel through which the user data is packet transmitted, a processor (resource) for the user data with respect to such a common channel is required where the common channel is taken into consideration. Described specifically, a baseband signal receiving section similar to the baseband signal receiving section 3 is further necessary even for the common channel in FIG. 1.

When, however, the baseband signal receiving sections identical in construction are respectively provided for dedicate and common channels in this way, there is a need to ensure channel resources corresponding to instantaneous maximum transmission rates every these dedicate and common channels. Accordingly, the channel resources redundant (i.e., superfluous) to the average amount of data transmitted between the base transceiver station and each mobile station are provided.

Figure 5:
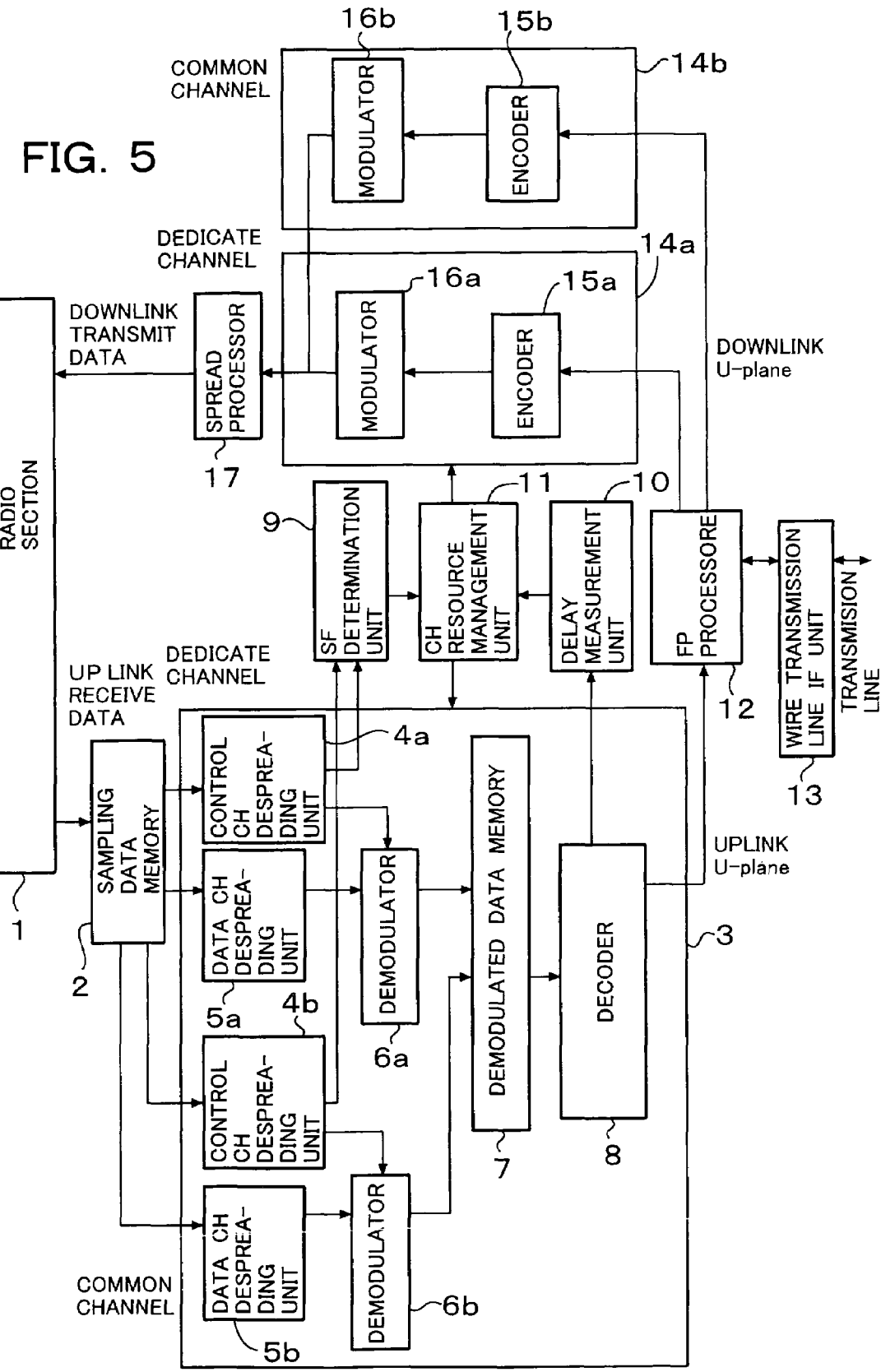
FIG. 5 is a block diagram illustrating a second embodiment of a radio mobile station according to the present invention.

FIG. 5 is a block diagram showing a second embodiment of a radio mobile station according to the present invention, which resolves such problems as described above. Reference numerals 4a and 4b respectively indicate control channel despreading units, reference numerals 5a and 5b respectively indicate data channel despreading units, reference numerals 6a and 6b respectively indicate demodulators, reference numeral 14a indicates a baseband signal transmitting section for each dedicated channel, reference numeral 14b indicates a baseband signal transmitting section for a common channel, reference numerals 15a and 15b respectively indicate encoders, and reference numerals 16a and 16b respectively indicate modulators. Portions or elements corresponding to those shown in FIG. 1 are given like reference numerals, and their dual explanations will be omitted.

When there are provided resources every common and dedicated channels in the same figure, such a configuration that such a baseband signal receiving section 3 as shown in FIG. 1 is provided every these channels, can be adopted. In the second embodiment, however, the control channel despreading unit 4a, the data channel despreading unit 5a and the demodulator 6a are provided as for each dedicated channel in a baseband signal receiving unit 3. Further, the control channel despreading unit 4b, the data channel despreading unit 5b and the demodulator 6b are provided as for the common channel. A demodulated data memory 7 and a decoder 8 are shared for the dedicate and common channels. Thus, the control channel despreading unit 4a, data channel despreading unit 5a, demodulator 6a, demodulated data memory 7 and decoder 8 constitute the baseband signal receiving section 3 for each dedicated channel, whereas the control channel despreading unit 4b, data channel despreading unit 5b, demodulator 6b, demodulated data memory 7 and decoder 8 constitute the baseband signal receiving section 3 for the common channel.

Now, a transmission format of each dedicated channel in this CDMA system and a transmission format of the common channel at packet transmission of user data are also similar to the transmission format of each radio channel in the first embodiment as shown in FIG. 2. Both transmission formats are equivalent to ones in which data channels and control channels are brought into multiplexing. In particular, each dedicated channel is based on the same transmission format as each radio channel employed in the first embodiment. Each dedicated channel is equivalent to the radio channel employed in the first embodiment.

On the other hand, when packetized user data is transmitted, such a transmission format as shown in FIG. 2 is adopted even to the common channel. The common channel is equivalent to one in which a control channel and a user channel are multiplexed. In each radio frame, however, time slots slot #0 through #14 are respectively assigned to discrete mobile stations in a cell. The respective mobile stations perform the transmission and reception of data to and from a base transceiver station in the allocated time slots every radio frames. Coded user data transmitted over the data channel for the common channel is subjected to modulation such as QPSK and spreading-factor SF-variable spreading modulation in, for example, a 10-msec unit equal to the radio frame shown in FIG. 2 and thereafter packetized one time slot by one time slot for each radio frame, followed by being transmitted. Control information transmitted over the control channel adopts the transmission format shown in FIG. 2 for each time slot.

From the above, the time slots in the common channel are associated with the radio channels with respect to their allocated mobile stations (users) where the packetized user data is transmitted. However, the radio channel at the common channel is different from the radio channel at each dedicated channel in terms of a time-division multiplexing transmission system. In the second embodiment, the time slots at the dedicate and common channels will collectively be referred to as "radio channels" from the above meaning.

Referring back to FIG. 5, spectrum spread modulated signals (received or receive data) of uplink dedicated channels, which are received at a radio section 1 and subjected to A/D conversion, are stored and held in a sampling data memory 2 every sampling data of plural word lengths with respect to their dedicated channels in a manner similar to the first embodiment. Spectrum spread modulated signals (received or receive data) containing packetized user data on an uplink common channel are stored and held in the sampling data memory 2 every sampling data having plural word lengths with respect to their time slots (i.e., respective mobile stations assigned time slots). The received data based on each dedicated channel stored in the sampling data memory 2 and the received data based on the common channel stored therein are supplied to the baseband signal receiving section 3.

In the baseband signal receiving section 3, the received data for the uplink dedicated channels supplied from the sampling data memory 2 are subjected to processing similar to the baseband signal receiving section 3 of FIG. 1 by the control channel despreading unit 4a, the data channel despreading unit 5a and the modulator 6a, so that despread and modulated can be obtained, followed by being stored in the demodulated data memory 7. Transmission format information (see FIG. 2) extracted from each control channel at the control channel despreading unit 4a is supplied to the spreading factor (SF) determination unit 9, where the corresponding spreading factor SF applied to each dedicated channel is calculated and a transmission rate at each dedicated channel is obtained. This transmission rate information is supplied to a channel resource management unit 11.

The received data sent from each mobile station assigned the same time slot brought to a unit word length (i.e., corresponding to the above radio frame) for modulation and spreading on the transmitter side of the uplink common channel supplied from the sampling data memory 2 is subjected to processing similar to the baseband signal receiving section 3 shown in FIG. 1 by the control channel despreading unit 4b, the data channel despreading unit 5b and the demodulator 6b, so that user data subjected to despreading and demodulation can be obtained, followed by being stored in the demodulated data memory 7. Transmission format information (see FIG. 2) extracted from a control channel at the control channel despreading unit 4b is supplied to the spreading factor (SF) determination unit 9, where a spreading factor SF applied to its corresponding data channel is calculated and a transmission rate at this data channel is obtained. This transmission rate information is supplied to the channel resource management unit 11.

Thus, the received user data of the radio channels subjected to the despreading and demodulation at both the dedicate and common channels are sequentially stored in the demodulated data memory 7. Further, the transmission rates for the user channels at that time, which are obtained from the transmission format information for the control information of these control channels, are supplied to the channel resource management unit 11.

The user data of the respective radio channels stored in the demodulated data memory 7 are read from the demodulated data memory 7 according to the transmission rates in a manner similar to the first embodiment, which in turn are supplied to the decoder 8, where framing processing is effected thereon for each data type after error correction processing corresponding to coding processing applied on the transmitter side and CRC detection based on predetermined parameters, followed by being supplied to a frame protocol (FP) processor 12. The frame protocol processor 12 performs frame protocol processing necessary for interface with each wire transmission line. The user data subsequent to the frame protocol processing are supplied to a wire transmission line interface (I/F) unit 13, where conversion such as assembly/deassembly or the like is effected on ATM (Asynchronous Transfer Mode) cells, after which the so-processed data are sent out to a radio network controller (RNC) corresponding to an unillustrated host device of a base transceiver station through the corresponding wire transmission line.

The result of decoding of the user data for the respective radio channels decoded by the decoder 8 is supplied to a delay measurement unit 10. The delay measurement unit 10 measures delay times at decoding processing of the radio channels every uplink dedicate and common channels radio channels from the frame numbers of the decoded radio frames (see FIG. 2) accompanying the result of decoding and timing information for detecting timing at which the decoding of each radio frame is completed, etc. The measured delay times are supplied to the channel resource management unit 11 as information set every radio channels. The channel resource management unit 11 manages the resources of the base transceiver station from the delay times and the transmission rates from the spreading factor determination unit 9. This management is carried out at all times (every slots used as the minimum units of the received data, for example (see FIG. 2)) or every predetermined periods or cycles (radio frames each comprising a plurality of the slots (see FIG. 2)).

On the other hand, the baseband signal transmitting section 14*a* for each dedicated channel, comprising the encoder 15*a* and the modulator 16*a*, and the baseband signal transmitting unit 14*b* for each dedicated channel, comprising the encoder 15*b* and the modulator 16*b* are provided for downlink communications from the base transceiver station to each mobile station. A spread processor 17 is shared for the dedicate and common channels.

Upon the downlink communications from the base transceiver station to each mobile station, the data at the respective radio channels received at the base transceiver station through an ATM circuit are assembled/disassembled. The frame protocol processor 12 performs conversion of each data to a transmission format and adjustments to timings provided to send out the data to the corresponding mobile station through a radio transmission line, in accordance with a frame protocol. Thereafter, the frame protocol processor 12 determines based on the format of a reception frame whether a transmission channel corresponds to each dedicated channel or the common channel. When the result of determination is found to correspond to each dedicated channel, its corresponding transmission user data is supplied to the baseband signal transmitting section 14*a* for each dedicated channel. In the baseband signal transmitting section 14*a*, the encoder 15*a* effects channel encoding processing on the user data supplied from the frame protocol processor 12, and the modulator 16*a* modulates the same in accordance with a modulation scheme such as QPSK or the like. The so-processed user data is subjected to spreading modulation processing based on a predetermined spreading code at the spread processor 17 and transmitted from the radio section 1 as downlink transmit data. When the result of determination is found to correspond to the common channel, the packet of transmit user data timing-adjusted to be sent in the corresponding time slot (FIG. 2: radio channel) is supplied to the baseband signal transmitting section 14*b* for the common channel. In the baseband signal transmitting section 14*b*, the user data supplied from the frame protocol processor 12 is subjected to channel encoding processing at the encoder 15*b* and modulated at the modulator 16 in accordance with the modulation scheme such as QPSK. The so-processed user data is subjected to spreading modulating processing based on a predetermined spreading code at the spread processor 17 and transmitted from the radio section 1 as downlink transmit data.

Even in the second embodiment, as a new call allocating procedure, the channel resource management unit 11 performs call reception where available resources are sufficient, based on the number of resources held in the base transceiver station, in response to a call reception request issued from the unillustrated host device (RNC apparatus) connected to the wire transmission line interface unit 13 through a wire transmission line. When it is judged that there is no vacancy corresponding to the used resource for the new call, the channel resource management unit 11 feeds back an error in response to the request issued from the host device and notifies to the host device that it cannot accept the request.

Therefore, even in the second embodiment, the management of channel resources is carried out in a manner similar to the first embodiment. As elements for determination of new call reception, two elements of a hardware resource (corresponding to each of physical resources such as the above despreading unit, demodulator, decoder, a memory and the like), and a software resource (temporal resource related to each processing timing where signal processing is carried out by software) are used.

In the baseband signal receiving section 3 of the base transceiver station in a manner similar to the previous first embodiment at the mention of the hardware resource, the channel resource management unit 11 always compiles spreading factor information set every radio channels outputted from the spreading factor determination unit 9 as uplink transmission rates of time slots (i.e., radio channels) assigned every mobile stations for the dedicate and common channels held in the base transceiver station, in other words, the transmitted amount of data per unit time, and manages resources with throughput as the reference. When the reception of each radio channel into a service area as instructions issued from the host network device takes place with respect to a newly-called base transceiver station, the channel resource management unit 11 compares the present number of available resources and the required number of resources based on the maximum transmission rate information of a newly-accepted radio channel. When it is judged that the result of comparison can be held in the base transceiver station at the present moment, the number of resources referred to above can be held at the hardware resource corresponding to the first determination element.

The baseband signal receiving section 3 monitors in real time the used number of resources (applied transmission rates) for the common channel applied to the transmission of control information for call setting and the transmission of packet user data transmitted between mobile stations and manages resources for the dedicated channels by the same functional unit for managing the resources for the dedicated channels, thereby making it possible to allocate the remaining resources at the dedicated channels to the common channel as the transmission rates applicable to the common channel.

Since the transmission of the control information for call setting is low in its data amount, the occupied time of the resource and the transmission rate are both low even though the common channel is used. On the other hand, in the case of the packet transmission of the user data, the transmission rate is assumed to dynamically vary depending upon adapted service applications (i.e., the type of user data). Therefore, upon the packet transmission of the user data, the application of each dedicated channel or the application of the common channel can be selected according to, for example, decisions by the type of mobile station, the type of application or the transmission rate of data, i.e., the system. When the packet user data is tentatively allocated to the common and dedicated channels according to the type of mobile station, the allocation of the resources to the dedicate and common channels can be changed appropriately by applying the resource management system according to the second embodiment, thus making it possible to realize such a configuration that the hardware resources at the base transceiver station can effectively be used. That is, each of the remaining resources obtained by subtracting the resources allocated to the dedicated channels from the resources at the entire base transceiver station is substituted with its corresponding transmission rate usable in the common channel, and hence the maximum transmission rate for each mobile station transmitted through the common channel can be enhanced. A change in transmission rate for the common channel is realized by a change in spreading factor or the number of spreading codes applied to one common channel.

The software resource is also similar to the previous first embodiment. The software resource places a restriction on the management of channel resources where timings for the radio channels are provided for the dedicate and common channels.

That is, when decoding start timings at the decoder 8, of the radio channels relative to the dedicate and common channels are ideally dispersed as shown in FIG. 3(*a*), an all-processing delay time $D_n$ in the base transceiver station, of a radio channel #n is expressed in the previous equation (1). On the other hand, when the decoding processing start timings overlap one another over a plurality of radio channels, an all-processing delay time $D_n$ in the base transceiver station, of the allocated radio channel #n at which decoding processing is finally started, is expressed in the previous equation (2) as shown in FIG. 3(*b*).

The decoding processing at the decoder 8 is assumed to be implemented by firmware such as DSP. When radio channels allocated every mobile stations (i.e., users) are set in plural form, processing of other radio channels cannot be executed unless processing of a radio channel for a given user is completed, and hence the processing of the respective radio channels become serial. When attention is paid to decoding processing of a given user, the decoding processing is executed periodically (at transmit time intervals). That is, when user data corresponding to a predetermined cycle of each radio channel is stored in the demodulated data memory 7 (i.e., when the processing of reception of a predetermined amount of data by the radio section comprising the control channel despreading units 4*a* and 4*b*, the data channel despreading units 5*a* and 5*b*, and the demodulators 6*a* and 6*b* is completed), the decoding processing at the decoder 8 for this radio channel is started. Although, for example, the reception processing is always performed at the radio section, the decoding processing is started when user data corresponding to 40 msec is stored in the demodulated data memory 7. The following decoding processing is not performed until the following user data is stored in the demodulated data memory 7 by 40 msec. Assuming that the time necessary for the decoding processing at the decoder 8 in this case is 10 msec, the proportion of decoding processing occupied by the decoder 8 with respect to the radio channel in this case results in 10 msec/40 msec.

The transmit time interval between the respective mobile stations might be identical to or different from one another. Transmit timings of the respective mobile stations relative to the base transceiver station are independent of one another and often different from one another. Therefore, when a decoding processing start timing of a given radio channel A does not overlap with a decoding processing period of other radio channel, latency time based on the decoding processing of the radio channel B is not produced with respect to the radio channel A. Therefore, the delay time of the radio channel A results in only a time required for the decoding processing. This is similar even where only one radio channel is set within the base transceiver station.

When the decoding processing start timing of the radio channel A overlaps during the decoding processing of the radio channel B, the radio channel A is placed in a standby state within the base transceiver station until the decoding processing of the radio channel B is completed (i.e., received data of the radio channel A is placed in a state of being stored in the demodulated data memory 7). Therefore, the processing delay time for the present radio channel results in one obtained by adding the time taken until the decoding processing for the radio channel is finished, to a decoding processing time at the decoder 8.

At this time, the delay times containing the delay times for the radio transmission line, wire transmission line and apparatus, which are required depending upon the type of adapted application, are defined as described in the previous first embodiment. Therefore, there is a need to send out the result of decoding of all uplink receive data within a prescribed delay time distributed to the base transceiver station as the throughput capacity of the base transceiver station. Since the decoding processing is managed by sequential frame numbers applied to radio frame units of received radio channels in the decoder 8 in the baseband signal receiving section 3 of the base transceiver station according to the second embodiment, the decoder 8 outputs the frame number of the corresponding radio frame to the delay measurement unit when the decoding of the radio frame is completed.

As shown in FIG. 6, each of the frame numbers is managed by a number at which a relative offset of each radio frame allocated for each radio channel is added to a reference timing (frame unit=10 msec) of the base transceiver station. Since the added relative offset is 0 with respect to a radio channel #a in the illustrated example, its frame number is equal to a frame number for the reference timing of the base transceiver station. In the radio channel #a, the frame number of the radio frame received with the reference timing 0 of the base transceiver station is defined as 0, and the frame numbers of its subsequent radio frames are sequentially defined as 1, 2, 3 . . . . On the other hand, an added relative offset is 1 in the case of a radio channel #b. Therefore, its frame number lags only 1 behind the frame number for the reference timing of the base transceiver station.

In a manner similar to the previous first embodiment, the delay measurement unit 10 calculates a difference between each of offset value information with respect to frame numbers at the completion of decoding every radio channels and transmission timings for the base transceiver station, which have been applied in advance to the respective radio channels, and operation timing information (base transceiver station reference timing in FIG. 3(b)) defined as the reference for the base transceiver station, from the offset value information and the operation timing information to thereby measure an uplink delay time. The radio channel #n shown in FIG. 3(b) will be explained by way example. Offset value information with respect to each transmission timing provided for the base transceiver station sets an offset (timing offset in FIG. 3(b)) from a radio frame 0 used as the reference associated with operation timing information used as the reference for the base transceiver station. The timing provided to start decoding processing at the decoder 8 is determined based on the timing offset. Thus, the delay measurement unit 10 is capable of detecting the timing provided to start decoding processing at the radio channel #n from the offset value information with respect to the transmission timing for the base transceiver station and the operation timing information used as the reference for the base transceiver station. When the result of decoding at the radio channel #n is supplied from the decoder 8 to the delay measurement unit 10, the delay measurement unit 10 can detect its supply timing from the operation timing information used as the reference for the base transceiver station. This timing is referred to as "decoding end timing". A decoding processing delay time $P_n$ at the radio channel #n can be acquired from the difference between the decoding end timing and the start timing for the decoding processing.

Incidentally, when the offset value information (i.e., timing offset) with respect to the transmission timing for the base transceiver station differs for each radio channel as shown in FIG. 3(a), the decoding processing delay time $P_n$ results in an actual processing time at the decoder 8. However, all decoding processing start timings at the plurality of radio channels #0 through #n coincide with one another as shown in FIG. 3(b). Therefore, when the decoding processing start timings are shifted from the timings designated by the timing offsets in order of the radio channels #0, #1, #2, . . . #n as expressed in the above equation (2), a decoding processing delay time $P_n$ corresponding to a latency time from the timing offset to the completion of preceding decoding processing of each radio channel increases. Since the decoding processing is started from the completion of decoding processing at the radio channels #0 through #n–1 in the case of the radio channel #n, for example, a decoding processing delay time $P_n$ corresponding to a latency time from the timing designated by the timing offset to the actual start of decoding processing increases.

The channel resource management unit 11 always monitors based on the uplink decoding processing delay amount set for each radio channel, calculated by the delay measurement unit 10, whether the decoding processing has been completed within a prescribed or specified time. With the execution of such monitoring, temporal resource management related to the processing timing corresponding to the second determination element is carried out.

In this case, a threshold value or level $T_{th}$ which allows a prescribed delay time to have a margin is set even in the second embodiment. When there exists a radio channel in which a processing delay exceeding the threshold value $T_{th}$ is being developed, the reception of a call is not made to such a radio channel that a call is newly made to the base transceiver station, even where the vacancy occurs in the hardware resource such as the despreading processing or the like corresponding to the first determination element.

This will be described in detail with the radio channel #n placed in such a state as shown in FIG. 3(b) being taken by way of example in a manner similar to the first embodiment.

Since the all-processing delay time of the radio channel #n is given as $D_n$, data at the radio channel #n received at a time t by the base transceiver station is outputted to the host device of the base transceiver station at a time $(t+D_n)$.

On the other hand, a delay time $(P+\alpha)$ is previously defined for a call set to the base transceiver station. Incidentally, P indicates a decoding processing time for a radio channel associated with a new call, and $\alpha$ indicates a time for processing prior to the decoding as mentioned above.

Assuming that the maximum all-processing delay time allowable for the base transceiver station is given as $D_{max}$, the time from the reception of the radio channel #n to the output thereof to the host device after each processing thereof must be not greater than the maximum all-processing delay time $D_{max}$. Thus, when the all-processing delay time $D_n$ of the radio channel #n exceeds the all-processing delay time $D_{max}$ in a state in which the radio channels #1 through #n are now being received, the reception of a new call is not carried out with the throughput capacity of the base transceiver station being over. Since a sufficient margin is not given in the case of $D_n \approx D_{max}$ where the radio channel of the new call is accepted, although the all-processing delay time $D_n$ of the radio channel #n does not exceed the all-processing delay time $D_{max}$, there may be cases where its all processing delay time $D_{n+1}$ exceeds the maximum all-processing delay time $D_{max}$ and the base transceiver station is over in its throughput capacity. In order to prevent it, the above threshold value $T_{th}$ is set and a new call is accepted in a state of communication with the current radio channel when there is a margin for the processing time of such a threshold value $T_{th}$.

Assuming that one example of the threshold value $T_{th}$ at which a processing delay time from the execution of the above respective processes on the corresponding radio channel after its reception in all service types accommodable in the base transceiver station to the output thereof to the host device is maximum, is expressed as $(P+\alpha)_{max}$, $T_{th}$ is given as follows:

$$T_{th} = (P+\alpha)_{max}$$

Therefore, now consider where a new call is given. Since the all-processing delay time of the radio channel #n maximum in all-processing delay time, of the radio channels currently held in the base transceiver station is $D_n$, the radio channel corresponding to the new call is accepted when the above equation (3), i.e., the following is given as follows:

$$D_n + T_{th} \leq D_{max} \quad (3)$$

When the equation (3) is not satisfied, the reception of a new call is avoided assuming that the used number of resources exceeds the number of resources available for the base transceiver station.

In the example shown in FIG. 3(b), the processing delay time of the radio channel #n is affected by the processing delay times of the radio channels #1 through #(n–1) at worst. A decoding processing delay time $P_n$ obtained by adding the decoding processing time of the radio channel #n per se to the above is defined as the processing delay time of the radio channel #n.

In FIG. 3(b), user data for the radio channel #n received by the base transceiver station at a time t is outputted from the base transceiver station to its host device at a time $(t+P_n)$ On the other hand, the delay time of a call set to the base transceiver station is defined in advance. That is, when the maximum processing delay time of the radio channel #n is defined as $P_{n(max)}$, the radio channel #n is received by the base transceiver station and the time form the execution of the above processing such as decoding thereon to the transmission thereof to the outside must be set to the maximum processing delay time $D_{n(max)}$ or less. Therefore, the processing delay time of the radio channel #n being received now is monitored. When its processing delay time exceeds the maximum processing delay time $P_{n(max)}$, the throughput capacity of the base transceiver station is assumed to be over and hence the reception of a new call is avoided. When $P_n \approx P_{n(max)}$, the radio channel #n has no processing time margin enough to merely accept a radio channel #(n+1) newly and process the same even though the processing delay time $P_n$ is within the prescribed time. Therefore, it is estimated that a state in which the processing delay time does not satisfy within the maximum processing delay time $P_{n+1(max)}$ of the radio channel #(n+1) takes place easily. Therefore, the threshold value $T_{th}$ is set as described above upon determination of the reception of a call due to a delay, and the reception of a new call is carried out only where the margin for the processing time enough to merely accept a new call exists.

Incidentally, even in the second embodiment, the management table in the channel resource management unit 11 shown in FIG. 5 is similar to one shown in FIG. 4, which has been described in the previous first embodiment. Its description will thus be omitted.

According to the second embodiment as described above, the resources for the dedicate and common channels are managed by the same channel resource management unit 11, and the resources (hardware resource and software resource) of the entire base transceiver station are distributed and allocated to these dedicate and common channels. It is therefore possible to change the allocation of the resources even between these dedicate and common channels. It is also possible to eliminate redundancy of each occupied resource, wherein an unused resource leans to one channel and allocate waste-free and proper resources to these dedicate and common channels.

While the preferred forms of the present invention have been described, it is to be understood that modifications will be apparent to those skilled in the art without departing from the spirit of the invention. The scope of the invention is to be determined solely by the following claims.

What is claimed is:

1. A base transceiver station comprising:
    a receiving section which receives spectrum spread data therein;
    a spreading factor determination unit which extracts a transmission format of the spectrum spread data received by the receiving section and calculates a spreading factor from the transmission format;
    a baseband signal receiver which despreads and decodes the spectrum spread data, based on the transmission format of the spectrum spread data;
    a measurement unit which calculates a processing time of said decoding taken at the baseband signal receiver; and
    a channel resource management unit which manages each of resources on the basis of the spreading factor calculated by the spreading factor determination unit and the processing time of decoding calculated by the measurement unit, and performs a new call setting.

2. A base transceiver station according to claim 1, wherein said management unit measures a processing time at said base transceiver station by calculating a difference between a start timing and an end timing for the decoding processing.

3. A base transceiver station according to claim 1, wherein said channel resource management unit holds a prescribed processing time at the base transceiver station and compares a threshold value calculated from said prescribed processing time at the base transceiver station and the processing time of said decoding calculated at said measurement unit, and when the processing time of decoding exceeds the threshold value the reception of a new call is not carried out.

4. A base transceiver station according to claim 1, wherein said channel resource management unit manages the resources of the base transceiver station every slot used as the minimum units of the spectrum spread data received by the receiving station.

5. A base transceiver station according to claim 1, wherein said channel resource management unit manages the resources of the base transceiver station every radio frame each comprising a plurality of the slots used as the minimum units of the spectrum spread data received by the receiving section.

6. A base transceiver station comprising:
    a receiving section which receives spectrum spread data which comprises user data of a data channel and control information of a control channel both brought into multiplexed form;
    a spreading factor determination unit which extracts a transmission format by despreading the control information of the control channel as spectrum spread data received by the receiving section and calculates a spreading factor from the transmission format;
    a baseband signal receiver which despreads and decodes user data of the data channel as the spectrum spread data, based on the transmission format;
    a measurement unit which calculates a processing time of said decoding of the user data of the data channel taken at the baseband signal receiver; and
    a channel resource management unit which manages each of resources on the basis of the spreading factor calculated by the spreading factor determination unit and the processing time of decoding calculated by the measurement unit, and performs a new call setting.

7. A base transceiver station according to claim 6, wherein said measurement unit measures a processing time at said base transceiver station by calculating a difference between a start timing and an end timing for the decoding processing.

8. A base transceiver station according to claim 6, wherein said channel resource management unit holds a prescribed processing time at the base transceiver station and compares a threshold value calculated from said prescribed processing time at the base transceiver station and the processing time of said decoding calculated at said measurement unit, and when the processing time of decoding exceeds the threshold value the reception of a new call is not carried out.

9. A base transceiver station according to claim 6, wherein said channel resource management unit manages the resources of the base transceiver station every slot used as the minimum units of the spectrum spread data received by the receiving section.

10. A base transceiver station according to claim 6, wherein said channel resource management unit manages the resources of the base transceiver station every radio frame each comprising a plurality of the slots used as the minimum units of the spectrum spread data received by the receiving section.

11. A base transceiver station comprising:
    a receiving section which receives therein spectrum spread data on dedicated channels allocated every mobile stations, and spectrum spread data on common channels transmitted on a time-division multiplexing basis from a plurality of the mobile stations by allocating the mobile stations every time slots;
    a spreading factor determination unit, which extracts transmission formats of the spectrum diffusion data on the dedicated channels received by the receiving section and calculates spreading factors from the transmission formats and extracts transmission formats of the spectrum spread data set every time slots of the common channel, received by the receiving section and calculates spreading factors of the received data of the time slots from the transmission formats;

a baseband signal receiver which despreads and decodes the spectrum spread data on the dedicated and common channels on the basis of the transmission formats of the spectrum spread data on the dedicated and common channels;

a measurement unit which calculates times for processing of said decoding of received data on the dedicated and common channels at the baseband signal receiver; and a channel resource management unit which manages resources relative to the dedicated and common channels on the basis of the spreading factors calculated by the spreading factor determination unit and the processing times of said decoding calculated by the measurement unit and performs a new call setting, wherein the baseband signal receiver comprises, a user channel despreading unit for said each dedicated channel, which despreads the spectrum spread data of a user channel for each dedicated channel on the basis of the transmission format of the spectrum spread data on said each dedicated channel, a demodulator for said each dedicated channel, which demodulates user data on said each dedicated channel, obtained by the despreading processing of the user channel despreading unit for said each dedicated channel, a user channel despreading unit for the common channel, which despreads the spectrum spread data on user channels set every said time slots of the common channel on the basis of the transmission formats of the spectrum spread data on the user channels set every said time slots of the common channel, a demodulator for the common channel, which demodulates user data set every said time slots of the common channel, obtained by the despreading processing of the user channel despreading unit for the common channel, a demodulated data memory which stores therein the demodulated user data outputted from the demodulator for said each dedicated channel and the demodulator for the common channel, and a decoder which decodes the user data stored in a predetermined amount in the demodulated data memory;

wherein the user data on the dedicated and common channels are decoded by the decoder common thereto, and the measurement unit calculates a processing time of said decoding at the decoder.

12. A base transceiver station according to claim 11, wherein said measurement unit measures a processing time at said base transceiver station by calculating a difference between a start timing and an end timing for the decoding processing.

13. A base transceiver station according to claim 11, wherein said channel resource management unit holds a prescribed processing time at the base transceiver station and compares a threshold value calculated from said prescribed processing time at the base transceiver station and the processing time of said decoding calculated at said measurement unit, and when the processing time of decoding exceeds the threshold value the reception of a new call is not carried out.

14. A base transceiver station according to claim 11, wherein said channel resource management unit manages the resources of the base transceiver station every slot used as the minimum units of the spectrum spread data received by the receiving station.

15. A base transceiver station according to claim 11, wherein said channel resource management unit manages the resources of the base transceiver station every radio frame each comprising a plurality of the slots used as the minimum units of the spectrum spread data received by the receiving section.

* * * * *